(12) United States Patent
Cavaliere et al.

(10) Patent No.: US 8,861,957 B2
(45) Date of Patent: Oct. 14, 2014

(54) OPTICAL ACCESS NETWORK

(75) Inventors: Fabio Cavaliere, Pisa (IT); Luca Giorgi, Pisa (IT); Antonio D'Errico, Pisa (IT); Renato Grosso, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 137 days.

(21) Appl. No.: 13/695,007

(22) PCT Filed: Apr. 28, 2010

(86) PCT No.: PCT/EP2010/055723
§ 371 (c)(1),
(2), (4) Date: Jan. 25, 2013

(87) PCT Pub. No.: WO2011/134507
PCT Pub. Date: Nov. 3, 2011

(65) Prior Publication Data
US 2013/0136447 A1    May 30, 2013

(51) Int. Cl.
*H04J 14/00* (2006.01)
*H04J 14/02* (2006.01)

(52) U.S. Cl.
CPC ......... *H04J 14/0282* (2013.01); *H04J 14/0269* (2013.01); *H04J 14/0257* (2013.01); *H04J 14/0267* (2013.01); *H04J 14/0202* (2013.01)
USPC .......................................................... 398/49

(58) Field of Classification Search
CPC .......................... H04J 14/0247; H04J 14/0252
USPC .......................................................... 398/49
See application file for complete search history.

(56) References Cited

U.S. PATENT DOCUMENTS

| | | | |
|---|---|---|---|
| 2006/0104638 A1* | 5/2006 | Chung et al. | 398/71 |
| 2006/0165412 A1* | 7/2006 | Jung et al. | 398/71 |
| 2008/0131122 A1 | 6/2008 | Reisslein et al. | |
| 2008/0181613 A1* | 7/2008 | Bouda | 398/98 |
| 2009/0010642 A1* | 1/2009 | Sui et al. | 398/9 |
| 2009/0016726 A1* | 1/2009 | Suzuki et al. | 398/79 |
| 2009/0263122 A1* | 10/2009 | Helkey et al. | 398/7 |
| 2011/0026922 A1* | 2/2011 | Ota et al. | 398/70 |
| 2011/0026930 A1* | 2/2011 | Cui et al. | 398/115 |

FOREIGN PATENT DOCUMENTS

EP          1761103 A1    3/2007

OTHER PUBLICATIONS

International Search Report, Application No. PCT/EP2010/055723, dated Feb. 2, 2011, 2 pages.

* cited by examiner

*Primary Examiner* — Shi K Li
*Assistant Examiner* — Mina Shalaby
(74) *Attorney, Agent, or Firm* — Blakely, Sokoloff, Taylor & Zafman, LLP (57) ABSTRACT

An optical access network comprises L wavelength division multiplexed access sub-networks. Each of the wavelength division multiplexed access sub-networks is arranged to use a set of wavelength channels. M optical line termination apparatus, each receive traffic from a respective operator network and output traffic on the wavelength channels. A wavelength routing apparatus comprises M sets of first ports and L second ports. Each set of first ports connects to a respective one of the optical line termination apparatus and each second port connects to an optical link of a respective one of the wavelength division multiplexed access sub-networks. The wavelength routing apparatus is arranged to route the set of wavelength channels between the sets of first ports and the second ports and to route different wavelength channels of the same wavelength to different ones of the second ports.

22 Claims, 8 Drawing Sheets

OPTICAL ACCESS NETWORK

CROSS-REFERENCE TO RELATED APPLICATIONS

This application is a National stage of International Application No. PCT/EP2010/055723, filed Apr. 28, 2010, which is hereby incorporated by reference.

TECHNICAL FIELD

This invention relates to wavelength division multiplexed (WDM) optical access networks, such as WDM passive optical networks (WDM-PONs).

BACKGROUND

Communications traffic at network edges is increasing over time due to the rising demand for a range of high-bandwidth services by business and residential customers. This rising demand places an increasing requirement on access networks to deliver those services.

One type of access network is a Passive Optical Network (PON). A PON typically has a central office (CO) at which apparatus called an Optical Line Termination (OLT) interfaces with a metro or carrier network. An arrangement of optical fibres and splitters connect the OLT with multiple Optical Network Termination units (ONTs). An ONT can be located at a subscriber premises in a Fibre To The Home (FTTH) system, or an ONT can be located at a roadside cabinet near to a group of premises in a Fibre To The Curb (FTTC) system. A PON is so-called because the optical transmission has no power requirements, or limited power requirements, once an optical signal is travelling through the network section connecting the ONT to the OLT.

Existing PONs are based on Asynchronous Transfer Mode Passive Optical Network (APON), Broadband PON (BPON), Gigagbit PON (GPON) and Ethernet PON (EPON) technologies as standardised by the International Telecommunications Union (ITU-T) and Institute of Electrical and Electronic Engineers (IEEE). Many of these PON technologies use some form of time division multiple access technique, with the capacity of a wavelength channel being shared in a time-divided manner across multiple ONTs.

More recently, Wavelength Division Multiplexed Passive Optical Networks (WDM PON) have been proposed. A WDM PON supports multiple wavelength channels. A separate wavelength can be allocated for communication between the Optical Network Unit (OLT) and each ONT in the PON.

In many cases an access network will already be deployed with an operator, called the incumbent operator, owning and operating the access network. In open markets, such as Europe, there is a regulatory requirement that a subscriber should be able to choose between a number of possible operators to provide their communications service. There is a problem of how to allow Other Local Operators (OLOs) to access the existing access network. This complicates the network equipment that must be provided, as an access network must be able to connect to one of a set of operator networks, as required by a subscriber.

SUMMARY

A first aspect of the present invention provides apparatus for use in an optical access network. The access network comprises L wavelength division multiplexed access sub-networks, where $L \geq 2$. Each of the wavelength division multiplexed access sub-networks is arranged to use a set of wavelength channels and has an optical link for carrying a signal comprising a multiplexed set of the wavelength channels. The apparatus comprises M optical line termination apparatus, where $M \geq 1$, each for receiving traffic from a respective operator network and for outputting traffic on the wavelength channels. The apparatus also comprises a wavelength routing apparatus comprising M sets of first ports and L second ports, each set of first ports for connecting to a respective one of the optical line termination apparatus and each second port for connecting to an optical link of a respective one of the wavelength division multiplexed access sub-networks. The wavelength routing apparatus is arranged to route the wavelength channels between the sets of first ports and the second ports and to route different wavelength channels of the same wavelength to different ones of the second ports.

An advantage of the apparatus is that it permits a full optical unbundling of the wavelengths used in multiple wavelength division multiplexed access sub-networks (e.g. WDM-PONS) to one, or multiple, operator networks. Different wavelength channels of the same wavelength can co-exist within the wavelength routing apparatus. This allows each of a plurality of wavelength division multiplexed access sub-networks to use a set of wavelength channels of the same wavelength, which has an advantage of allowing similar equipment to be installed in each wavelength division multiplexed access sub-network, thereby simplifying and reducing the overall cost of the equipment. The wavelength routing apparatus can route these wavelength channels to a respective optical line termination apparatus.

Advantageously, the wavelength routing apparatus is arranged to route different wavelength channels of the same wavelength received from one of the optical line termination apparatus to different ones of the second ports. This allows an optical line termination (OLT) apparatus associated with a particular operator network to serve subscribers in a plurality of different wavelength division multiplexed access sub-networks, even where the subscribers use the same wavelength for their respective wavelength channel. The wavelength routing apparatus ensures that multiple wavelength channels of the same wavelength do not collide.

Advantageously, the wavelength routing apparatus is operable in downstream and upstream directions. In the upstream direction the wavelength routing apparatus is arranged to route wavelength channels between the second ports and the sets of first ports. Advantageously, the wavelength routing apparatus is arranged to route different wavelength channels of the same wavelength received from different ones of the second ports to one of the sets of first ports. The wavelength channels used in the upstream direction can be at different wavelengths to the wavelength channels used in the downstream direction.

Advantageously, the wavelength routing apparatus comprises L splitter/combiners each connected to a respective one of the second ports. Each splitter/combiner has a plurality of third ports and is arranged to combine and output on the second port signals received on the plurality of third ports. The wavelength routing apparatus also comprises M wavelength routing devices each connected to a respective one of the sets of first ports and also has fourth ports. Each wavelength routing device is arranged to route wavelength channels between the set of first ports and the fourth ports in dependence upon a wavelength of the wavelength channel and on which port of the set of first ports the wavelength channel is received. The wavelength routing apparatus also comprises links arranged to connect the fourth ports of the wavelength routing devices to the third ports of the L splitter/ combiners. Each wavelength routing device can separately route different wavelength channels of the same wavelength to different ones of the fourth ports, thereby allowing an optical line termination (OLT) apparatus associated with a particular operator network to serve subscribers in a plurality of different wavelength division multiplexed access sub-networks, even where the subscribers use the same wavelength for their respective wavelength channel. The wavelength routing device ensures that multiple wavelength channels of the same wavelength do not collide.

An advantage of the apparatus is that it is readily scalable as additional operators require connection to the access network, as a further wavelength routing device and a further optical line termination apparatus can be added to connect to a new operator network. A further advantage of the apparatus is that it allows the possibility for Central Office equipment of different operators to be installed at different locations. For example, the OLT of one operator can be located remote from the OLT of another operator.

Advantageously, the wavelength routing devices are cyclic arrayed waveguide gratings. The cyclic arrayed waveguide gratings can be N×N cyclic arrayed waveguide gratings each having a set of N first ports and a set of N fourth ports.

Another aspect of the invention provides a method of operating apparatus in an optical access network comprising L wavelength division multiplexed access sub-networks, where L≥2. Each of the wavelength division multiplexed access sub-networks is arranged to use a set of wavelength channels. Each wavelength division multiplexed access sub-network has an optical link for carrying a signal comprising a multiplexed set of the channels. The apparatus comprises M optical line termination apparatus, where M≥1. Each optical line termination apparatus is connected to a respective operator network. The method comprises receiving traffic on wavelength channels from one of the optical line termination apparatus. The method further comprises routing the wavelength channels to the wavelength division multiplexed access sub-networks such that different wavelength channels of the same wavelength are routed to different wavelength division multiplexed access sub-networks.

BRIEF DESCRIPTION OF THE DRAWINGS

Embodiments of the invention will be described, by way of example only, with reference to the accompanying drawings in which.

DETAILED DESCRIPTION

Figure 1:
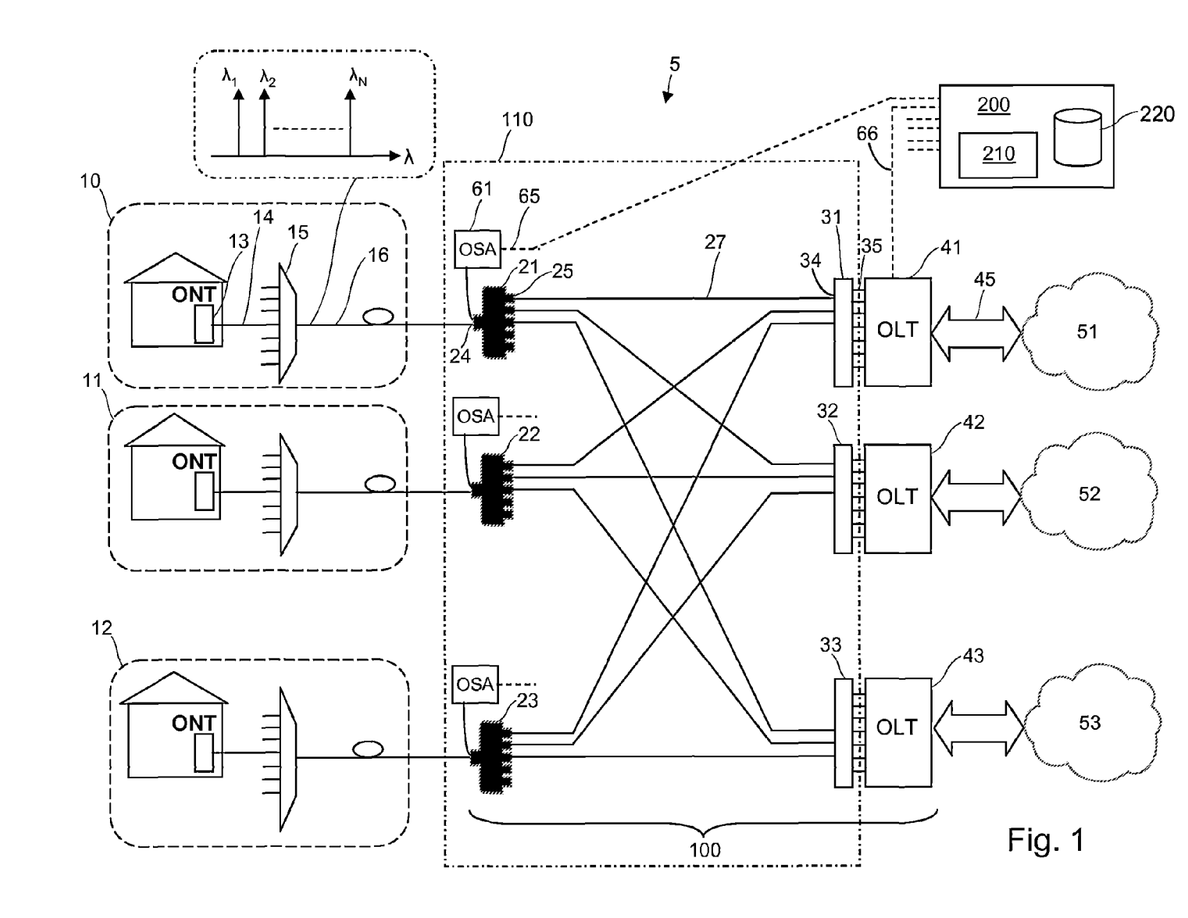
FIG. 1 shows an embodiment of an optical access network comprising multiple WDM-PONs and connections to multiple operator networks.

FIG. 1 shows an optical access network 5 according to a first embodiment of the present invention. The optical access network 5 comprises a plurality of access sub-networks 10, 11, 12. Each access sub-network in FIG. 1 is a WDM-PON 10, 11, 12. The optical access network 5 connects to multiple operator networks 51, 52, 53. Each WDM-PON 10, 11, 12 has a tree-like structure of fibres 14 emanating from a trunk fibre 16. Each WDM-PON 10, 11, 12 can be used as an access network to serve Optical Network Termination units (ONTs) 13. ONTs can be deployed at individual subscriber premises or at curbside cabinets, depending on the type of PON architecture. In an implementation where ONTs are deployed at curbside cabinets, electrical cables connect the ONT to terminals at subscriber premises. Each WDM-PON 10, 11, 12 can serve residential customers, commercial customers, wireless infrastructure (e.g. wireless base stations or access points), or any mix of these.

The optical access network 5 comprises apparatus 41, 42, 43, 110 for interconnecting the wavelength division multiplexed passive optical networks (WDM-PON) 10, 11, 12 and operator networks 51, 52, 53. Apparatus 41, 42, 43, 110 can be installed at a Central Office (CO) 100 and, for clarity, FIG. 1 shows this arrangement. However, an advantage of embodiments of the invention is that the apparatus 41, 42, 43, 110 can be distributed across different physical locations. The multiple wavelength division multiplexed passive optical networks (WDM-PON) 10, 11, 12 each connect with the CO 100. Central Office 100 interfaces with metro or core communication networks 51, 52, 53 belonging to different operators. The operators are different telco providers who can compete to offer a communications service to subscribers served by the WDM-PONs 10, 11, 12. CO 100 comprises apparatus for each operator who wishes to provide a communication service to any of the subscribers served by the WDM-PONs 10, 11, 12. For each operator, there is an optical line termination unit (OLT) 41, 42, 43.

In each WDM-PON 10, 11, 12 a set of wavelength channels, called lambdas λ, are allocated for communication between the Central Office 100 and ONTs 13. In an advantageous scheme, a single lambda is allocated for communication between the Central Office 100 and a single ONT 13. A set of wavelength channels are carried between the CO and a remote node 12 on a trunk fibre 16, and then passively demultiplexed at a remote node 15 onto a set of fibres 14. Each fibre 14 carries a single wavelength channel to an ONT 13.

Network 5 supports communication in an upstream direction (i.e. from an ONT 13 towards an OLT 41, 42, 43) and in a downstream direction (i.e. from an OLT 41, 42, 43 towards an ONT 13). Bi-directional communication can be achieved in various ways, such as by the use of two wavelength channels to each ONT (i.e. one wavelength channel $\lambda_D$ for downstream communication and a different wavelength channel $\lambda_U$ for upstream communication) or by time-division multiplexed use of a single wavelength channel.

For clarity, in the following description the term "Central Office side", or simply "CO side", refers to the side of network apparatus nearest the operator networks 51, 52, 53 and the term "user side" refers to the side of network apparatus nearest the ONTs 13.

Optical apparatus 110, which will be called wavelength routing apparatus 110, connects the WDM-PONs 10, 11, 12 and the OLTs 41, 42, 43. The wavelength routing apparatus 110 works in the upstream and downstream directions. In the upstream direction, the wavelength routing apparatus 110 routes wavelengths between the WDM-PONs 10, 11, 12 and the OLTs 41, 42, 43 so that a particular wavelength channel is connected between a WDM-PON and an OLT of a required operator network. In the downstream direction, the wavelength routing apparatus 110 routes wavelengths between the OLTs 41, 42, 43 and the WDM-PONs 10, 11, 12 so that a particular wavelength channel is connected between an OLT of a required operator network and an ONT. The wavelength routing apparatus 110 can separately route multiple wavelength channels of the same wavelength. This has several applications. Firstly, it allows multiple OLTs 41, 42, 43 to use the same wavelength in different WDM-PONs. For example, OLT 41 can use a particular wavelength—say $\lambda_1$—for a wavelength channel between the OLT 41 and WDM-PON 10, OLT 42 can use $\lambda_1$ for a wavelength channel between the OLT 42 and WDM-PON 11 and OLT 43 can use $\lambda_1$ for a wavelength channel between the OLT 43 and WDM-PON 12. Secondly, it allows a particular OLT to use the same wavelength for a wavelength channel serving each of a plurality of different WDM-PONs 10, 11, 12. For example, a wavelength—say $\lambda_2$—used for communication between OLT 41 and an ONT 13 in WDM-PON 10 can also be used for communication between OLT 41 and an ONT 13 in WDM-PON 11 and for communication between OLT 41 and an ONT 13 in WDM-PON 12. Separation is maintained between multiple instances of the same wavelength within the OLTs and wavelength routing apparatus 110, allowing each instance of the wavelength to carry different traffic.

Figure 3:
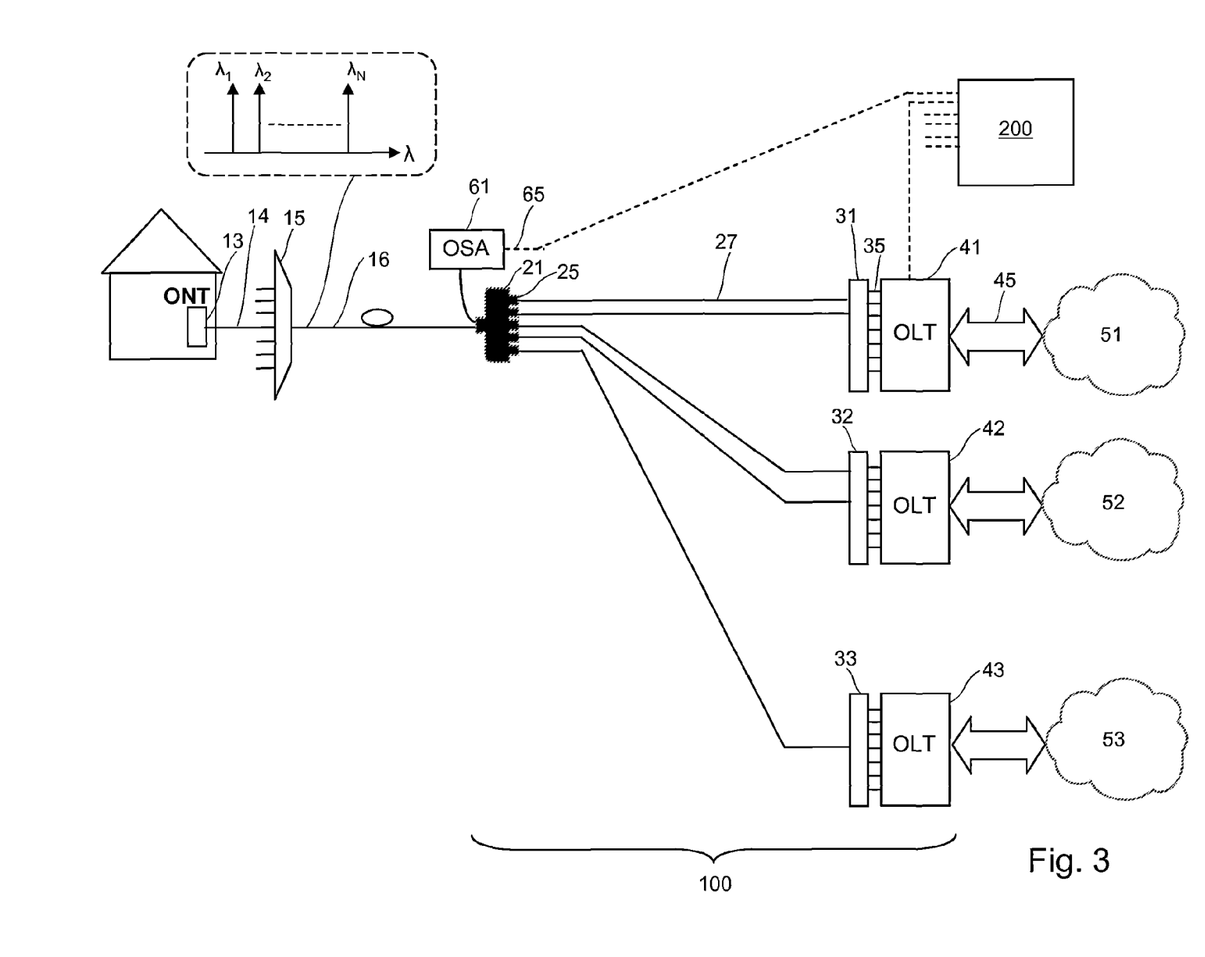
FIG. 3 shows an optical access network comprising a single WDM-PON and connections to multiple operator networks.
Figure 4:
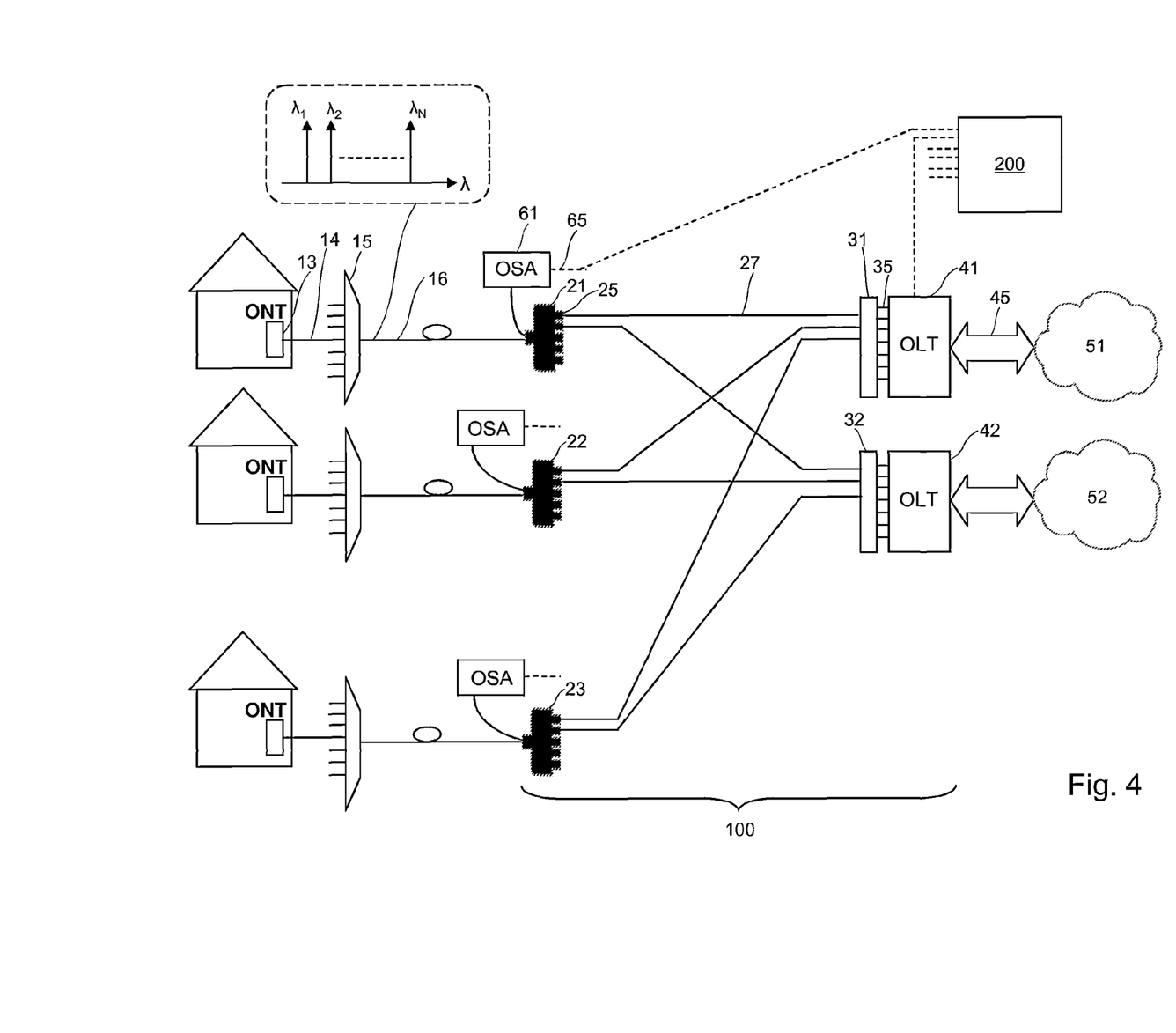
FIG. 4 shows another embodiment of an optical access network comprising multiple WDM-PONs and connections to multiple operator networks.

FIGS. 1, 3 and 4 show an advantageous form of the wavelength routing apparatus 110. Each trunk fibre 16 leading to a WDM-PON 10, 11, 12 connects to a respective splitter/combiner 21, 22, 23. Splitter/combiner 21 comprises a port 24 on the user side of the device for connecting to trunk fibre 16 and a set of ports 25 on the CO side of the device 21. In the upstream direction, splitter/combiner 21 functions as a splitter and replicates the set of signals ($\lambda_1$-$\lambda_N$) received on fibre 16 onto each of the ports 25 on the CO side of the splitter. In the downstream direction, splitter/combiner 21 functions as a combiner and combines the set of signals received on ports 25 and transmits the combined signal on port 24 on the user side of the splitter. A wavelength routing device 31, 32, 33 connects to the user side of a respective OLT 41, 42, 43. In FIGS. 1, 3 and 4 each wavelength routing device 31, 32, 33 is a cyclic arrayed waveguide grating (AWG) 31, 32, 33. There is a set of ports 34 on the user side of each cyclic AWG and a set of ports 35 on the CO side of each cyclic AWG. The cyclic AWG can be an N port×N port device, or other sized devices can be used. Each CO side port 35 connects to a port on the user side of OLT 41. Ports 34 on the user side of the cyclic AWG 31 connect, via fibres 27, to ports 25 on the splitters 21, 22, 23. The cyclic AWG 31 provides a wavelength multiplexing/demultiplexing function and a wavelength routing function. In the upstream direction, a set of wavelength signals ($\lambda_1$-$\lambda_N$) received on a user side port 34 are demultiplexed onto the set of CO side ports 35. In the downstream direction, a set of wavelength signals ($\lambda_1$-$\lambda_N$) received on the set of CO side ports 35 are multiplexed and output on one of the user side ports 34. Operation of the cyclic AWG is described in more detail later. A Cyclic AWG can carry a wavelength pair per port. One of the wavelengths in a wavelength pair is used for upstream communication and the other wavelength in a wavelength pair is used for downstream communication. The separation between the two wavelengths is fixed and does not depend on the considered port. Advantageously, the upstream and downstream wavelengths are located in different frequency bands. For example, the range 1530 nm-1560 nm can be used for downstream communication, and the range 1570 nm-1600 nm can be used for upstream communication. In this example, the offset between a downstream wavelength and the corresponding upstream wavelength, on the same AWG port, is 40 nm. Table 1, shown later, can be considered to define one of the wavelengths in the wavelength pair. The other wavelength in the wavelength pair is found by adding a fixed wavelength offset to the value in Table 1. The wavelength routing apparatus shown in FIGS. 1, 3 and 4 is passive and static. The term "static" means that the wavelength routing relationship between input ports of the cyclic AWG and output ports of the cyclic AWG, and between input ports of the cyclic AWG and output ports of the combiner, is static, and does not change.

Figure 2:
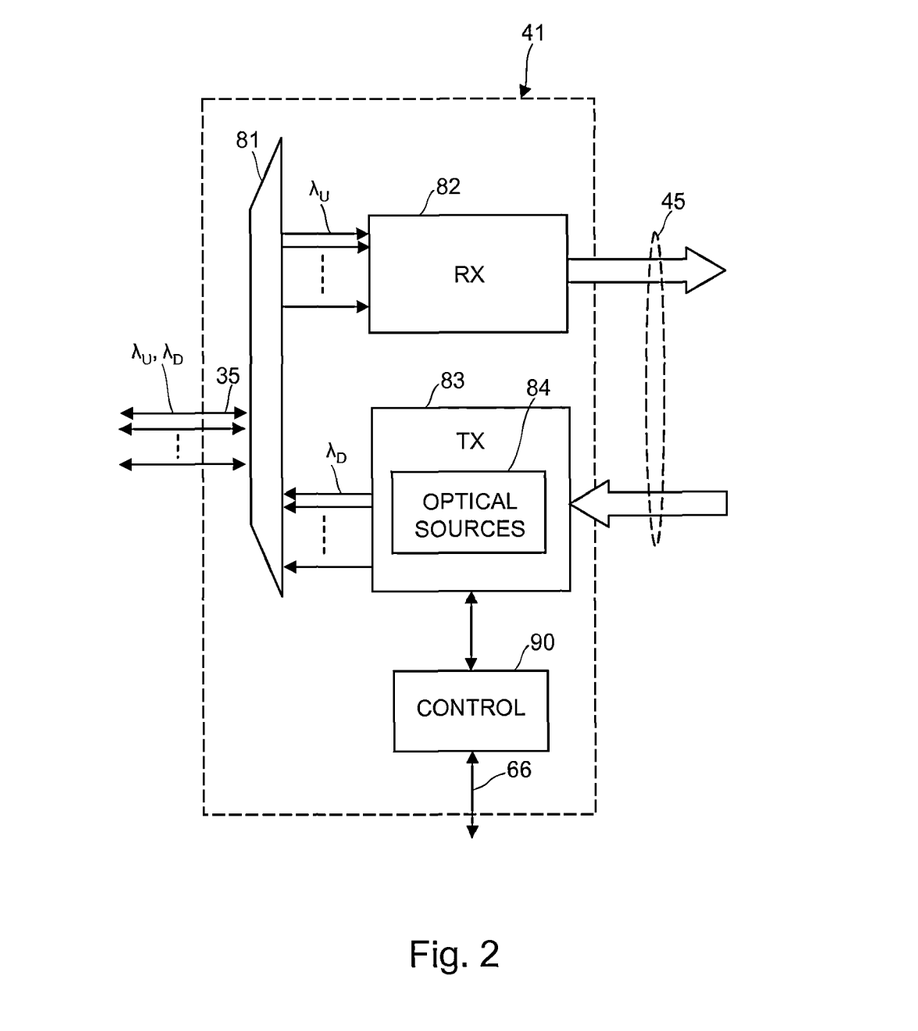
FIG. 2 shows an optical line termination unit for use in the optical access network.

FIG. 2 shows one of the optical line termination units (OLT) 41 of FIG. 1 in more detail. On one side, the OLT 41 comprises a set of ports 35 which connect to a cyclic AWG 31. On the other side, the OLT 41 comprises an interface 45 to a metro or core network of that operator. In FIG. 2, each port 35 carries a wavelength channel $\lambda_U$ used for upstream communication and a separate wavelength channel $\lambda_D$ used for downstream communication. In the upstream direction, unit 81 forwards the wavelengths used for upstream communication from ports 35 to a receiver unit 82. Each wavelength channel comprises an optical signal which is modulated in some way (e.g. by phase or amplitude/intensity modulation) with coded data. In one embodiment of the OLT 41, each upstream wavelength channel is demodulated by receiver unit 82. In the reverse direction, signals are received from interface 45 and an optical source 84 in transmitter unit 83 is modulated with the data signal to form a wavelength channel. A set of wavelength channels are combined by unit 81 and output from a port 35 of the OLT 41. Optical sources 84 can be fixed wavelength sources which are connected to a required port of the transmitter unit 83, such as by a manual or an automatic switching operation. More advantageously, optical sources 84 are tunable devices which can be caused to operate at a required wavelength. A tunable source 84 is associated with each port of the transmitter unit 83. A transceiver comprises a combination of a receiver device in receiver unit 82 and a transmitter device in transmitter unit 83. Control unit 90 controls operation of the optical sources 84. Control unit 90 interfaces 66 with a network management unit 200. FIG. 2 shows one example form of the OLT 41 and it will be appreciated that it can take different forms. In an alternative embodiment, the OLT can be fully optical, with no electrical-to-optical conversion. The OLT can receive an optical signal from an operator network at a particular wavelength and either (i) forward it at the received wavelength or (ii) adjust the wavelength of the received optical signal to a wavelength required in the destination WDM-PON. Interface 45 can take various forms. Interface 45 can comprise functions such as an interface to a WDM or Dense Wavelength Division Multiplexed (DWDM) link used to connect to the operator network 51 and a switching function to switch signals between required channels of the OLT and required channels of the WDM/DWDM link.

The apparatus shown in FIG. 1 supports full optical unbundling. Any wavelength ($\lambda_1$-$\lambda_N$) from any one of the WDM-PONs 10, 11, 12 can connect, via a respective splitter 21, 22, 23, and a cyclic AWG 31, 32, 33, with an OLT 41, 42, 43 of a desired operator. For example, consider a subscriber in WDM-PON 10 is allocated wavelength $\lambda_1$. This subscriber receives a communication service from operator network 53. Wavelength $\lambda_1$ from WDM-PON 10 is split at splitter 21 onto a set of fibres 27. One of these fibres 27 connects with an input port of cyclic AWG 33. Wavelength $\lambda_1$ travels through the cyclic AWG 33, and from an output port of the cyclic AWG 33 to OLT 43 of operator network 53. Any OLT 41, 42, 43 of an operator can connect to one, or more, of the WDM-PONs 10, 11, 12. Similarly, in the downstream direction, any of the OLTs 41, 42, 43 of an operator can connect, via a respective cyclic AWG 31, 32, 33 and a splitter 21, 22, 23 with any one of the WDM-PONs 10, 11, 12.

Two optical interfaces emitting at the same wavelength (i.e. two wavelengths of the same value, each carrying different traffic for different customers) can coexist in the same OLT provided that they are sent to two different WDM-PONs 10, 11, 12. The cyclic AWG maintains separation of the wavelengths at the OLT itself. This property exists for upstream and downstream directions of communication. Consider again the example of a wavelength $\lambda_1$ used for communication between OLT 41 and an ONT 13 in WDM-PON 10. For the downstream direction of communication, traffic on wavelength $\lambda_1$ is received from OLT 41 on one of the ports 35 of AWG 31 and routed to an output port 34 of the AWG 31 which is connected to the splitter 21 connected to WDM-PON 10. Also, (different) traffic on wavelength $\lambda_1$ is received from OLT 41 on another of the ports 35 of AWG 31 and routed to an output port 34 of the AWG 31 which is connected to splitter 22 connected to WDM-PON 11. For the upstream direction of communication, traffic on wavelength $\lambda_1$ is received at port 24 of splitter 21 from WDM-PON 10 and forwarded to a port 34 of AWG 31. AWG 31 routes wavelength $\lambda_1$ to a port 35, which is connected to a receiver in OLT 41 configured to receive traffic on this wavelength. Also, (different) traffic on wavelength $\lambda_1$ is received at a port 24 of splitter 22 from WDM-PON 11 and forwarded to another port 34 of AWG 31. AWG 31 routes wavelength $\lambda_1$ to a port 35, which is connected to a receiver in OLT 41 configured to receive traffic on this wavelength. There are two instances of the wavelength $\lambda_1$ co-existing in the apparatus, but these are separately routed in the downstream direction between an OLT 41 and different WDM-PONs 10, 11, and in the upstream direction between WDM-PONs 10, 11 and the OLT 41. THis property of the wavelength routing apparatus 110 allows two or more of the WDM-PONs 10, 11, 12 to simultaneously use the same set of wavelengths ($\lambda_1$-$\lambda_N$), and for any of the OLTs 41, 42, 43 to serve multiple ONTs 13 in different WDM-PONs operating on the same wavelength.

A further feature of the apparatus shown in FIG. 1 is a monitoring arrangement for monitoring which wavelengths are in use in each of the WDM-PONs 10, 11, 12. On the user side of each splitter 21, 22, 23 a small portion of the optical signal is tapped and coupled to a monitoring device 61. The monitoring device 61 connects 65 with a management unit 200. The monitoring device 61 can simply forward the optical signal tapped at the splitter 21, for analysis at unit 200 or, advantageously, it is an Optical Spectrum Analyser (OSA) for analysing which wavelengths are in use and forwarding a data signal to the management unit 200 indicating which wavelengths are in use. Management unit 200 also connects, via a respective path 66, with each of the OLT units 41, 42, 43.

Management unit 200 controls configuration of the system. Management unit 200 determines, from the information received via paths 65, which wavelength channels are in use on each of the WDM-PONs 10, 11, 12. This information is held as a look-up table in store 220. Advantageously, this information is accessible by the OLTs 41, 42, 43 of different operator networks, thereby allowing the different operator networks to co-ordinate their use of wavelength channels. For example, if OLT 41 is already using wavelength $\lambda_1$ to serve an ONT in WDM-PON 10, then other OLTs 42, 43 will not use this wavelength channel to serve an ONT in WDM-PON 10.

The wavelength routing unit 110 shown in FIG. 1 uses cyclic AWGs (e.g. N×N AWGs). It will now be described how a cyclic AWG operates. A cyclic AWG operates as a static wavelength router. A cyclic AWG is a device having a set of input ports and a set of output ports. An N×N cyclic AWG will be considered (N input ports, N output ports). Similarly to a regular (non-cyclic) AWG, when a comb of N wavelengths is applied at one input port, the wavelengths in the comb are split so that each wavelength of the comb is present at a corresponding output port. If an equal comb is applied to a different input port, the wavelengths are split again among the output ports, but in a different order. This ensures that no output port experiences a collision of equal wavelengths coming from different input ports. Table 1 gives a simple example for a 10 channel AWG. Typical cyclic AWGs support 40 channels or more.

TABLE 1

Operation of a cyclic AWG

|  |  | AWG Input Port | | | | | | | | | |
|---|---|---|---|---|---|---|---|---|---|---|---|
|  |  | 1 | 2 | 3 | 4 | 5 | 6 | 7 | 8 | 9 | 10 |
| AWG Output Port | 1 | λ1 | λ2 | λ3 | λ4 | λ5 | λ6 | λ7 | λ8 | λ9 | λ10 |
|  | 2 | λ2 | λ3 | λ4 | λ5 | λ6 | λ7 | λ8 | λ9 | λ10 | λ1 |
|  | 3 | λ3 | λ4 | λ5 | λ6 | λ7 | λ8 | λ9 | λ10 | λ1 | λ2 |
|  | 4 | λ4 | λ5 | λ6 | λ7 | λ8 | λ9 | λ10 | λ1 | λ2 | λ3 |
|  | 5 | λ5 | λ6 | λ7 | λ8 | λ9 | λ10 | λ1 | λ2 | λ3 | λ4 |
|  | 6 | λ6 | λ7 | λ8 | λ9 | λ10 | λ1 | λ2 | λ3 | λ4 | λ5 |
|  | 7 | λ7 | λ8 | λ9 | λ10 | λ1 | λ2 | λ3 | λ4 | λ5 | λ6 |
|  | 8 | λ8 | λ9 | λ10 | λ1 | λ2 | λ3 | λ4 | λ5 | λ6 | λ7 |
|  | 9 | λ9 | λ10 | λ1 | λ2 | λ3 | λ4 | λ5 | λ6 | λ7 | λ8 |
|  | 10 | λ10 | λ1 | λ2 | λ3 | λ4 | λ5 | λ6 | λ7 | λ8 | λ9 |

According to the table, from k=1, . . . 10:

$\lambda_k$ is sent from input port 1 to output port k $\lambda_{(k+1) mod\ 10}$ is sent from input port 2 to output port k $\lambda_{(k+2) mod\ 10}$ is sent from input port 3 to output port k and so on.

Configuration

One example implementation of configuring the access network will now be described. A configuration unit 210 performs the method. The configuration unit 210 can form part of the management unit 200, or can comprise a further functional unit of the access network 5. As a further alternative, each OLT 41, 42, 43 can have a dedicated configuration unit 210. Each OLT 41, 42, 43 uses three different tables. A first table (Table 1 above) indicates what wavelength corresponds to each output port/input port pair of the N×N cyclic AWG. To explain this table, consider that a signal at wavelength λ2 is applied to input (CO side) port 2. The signal is emitted on output (user side) port 1. Similarly, if wavelength λ2 is received at output (user side) port 1 it will emerge on input (CO side) port 2. Other instances of signals at the same wavelength λ2 can be applied to other input ports of the OLT and they are emitted on output ports according to Table 1. So, a signal λ2 applied to input (CO side) port 3 is emitted from output (user side) port 10 and a signal λ2 applied to input (CO side) port 4 is emitted from output (user side) port 9.

A second table (Table 2 below) indicates what wavelengths are currently used at that OLT. An example is shown below.

TABLE 2

|  |  | λ1 | λ2 | λ3 | λ4 | λ5 | λ6 | λ7 | λ8 | λ9 | λ10 |
|---|---|---|---|---|---|---|---|---|---|---|---|
| AWG Output Port | 1 | x |  | x |  |  | x | x |  |  |  |
|  | 2 |  |  |  |  |  |  |  |  |  |  |
|  | 3 |  | x |  |  |  |  |  |  |  |  |
|  | 4 |  |  |  |  |  |  | x |  |  |  |
|  | 5 |  |  |  |  | x |  |  |  |  | x |
|  | 6 |  |  |  |  |  |  |  |  |  |  |
|  | 7 |  |  |  |  | x |  |  |  |  |  |
|  | 8 |  |  |  |  |  |  |  |  |  |  |
|  | 9 |  |  |  |  |  |  |  |  |  |  |
|  | 10 |  |  |  |  |  | x |  |  |  | x | where "x" indicates the wavelength indicated in column is already used on the WDM-PON corresponding to the AWG output port indicated in the column. In this example, the WDM-PON corresponding to output (user side) port 1 already uses the wavelengths λ1, λ3, λ6 and λ7. Table 2 can be populated using the wavelength monitoring function described earlier. Before allocating a wavelength, Table 2 is updated using the latest information 220 which has been obtained using the wavelength monitoring function. If operator networks share information about which wavelengths they have assigned in each WDM-PON, then this shared information can be used to populate Table 2, without needing to perform the wavelength monitoring function.

A third table (Table 3 below) indicates what input (CO side) ports are already in use on the N×N cyclic AWG:

TABLE 3

| AWG Input Port | | | | | | | | | | |
|---|---|---|---|---|---|---|---|---|---|---|
| 1 | 2 | 3 | 4 | 5 | 6 | 7 | 8 | 9 | 10 |
| x |  |  |  | x |  |  | x | x |  | where "x" indicates the input port is busy and cannot be used.

Now consider an example in which an operator receives a subscription request for the WDM-PON corresponding to AWG output (user side) port 1 of its OLT. The configuration module checks Table 2 for the available wavelengths on the WDM-PON connected to that port, which are λ2, λ4, λ5, λ8, λ9, λ10 in this example. The configuration module then selects one of these wavelengths, e.g. λ2. Using Table 1, the configuration module determines which input port corresponds to λ2☐ on the output port 1. Stated another way, the configuration module determines which input (CO side) port a signal at λ2 must be applied to in order for it to emerge on output port 1 corresponding to the required WDM-PON. In this example, it is input port 2. The configuration module determines, using Table 2, if input port 2 is free. In this example it is free, so a transceiver can be connected to this input (CO side) port. The tables shown above can be held as data structures in a data store 220 at the management unit 200 or at some other data store which is accessible by the configuration unit 210. In this example the wavelength λ2 is selected. The tables are updated to indicate that λ2 is now in use. No other instance of λ2 can be used by the OLT to serve an ONT in the same WDM-PON. λ2 is marked as "in use" in Table 2 for output port 2, and for all other output ports which are connected to the same WDM-PON. Also, the corresponding Table 2 held for other OLTs is updated to indicate that λ2 is "in use" on any output ports which connect to the WDM-PON where λ2 has just been allocated. This prevents other OLTs from allocating the same wavelength. λ2 can still be used by the OLT to serve an ONT in any another WDM-PON where λ2 is not already in use.

In FIG. 1 there are multiple WDM-PONs 10, 11, 12 and multiple AWGs 31, 32, 33 and OLTs 41, 42, 43 connecting to operator networks 51, 52, 53. Each passive splitter 21, 22, 23 is shown with a single link 27 to a cyclic AWG. There can be multiple links 27 between different splitter ports 25 of a particular splitter 21 and different output (user side) ports 34 of a particular cyclic AWG 31. Providing multiple links 27 allows a greater opportunity for routing a required wavelength between an OLT 41 and a WDM-PON 10. Referring again to the configuration example described above, consider that the WDM-PON is connected to output (user side) ports 1 and 2 of the cyclic AWG. There are now more opportunities that an input (CO side) port on the AWG will be free. An operator network 51 can connect to multiple OLT units to further increase capacity. When there is only a single link 27 between an OLT 31 and a splitter 21 serving a WDM-PON, the cyclic AWG will, by itself, prevent any more than one instance of a wavelength being output to a given WDM-PON. Referring to Table 1, only once instance of wavelength λ1 will be output to port 1. When there are multiple links 27 between an OLT 31 and a splitter 21 serving a WDM-PON, there is a possibility that multiple instances of a wavelength can be output to a given WDM-PON. Referring to Table 1, consider that output (user side) ports 1 and 2 connect to splitter 21 serving WDM-PON 10. Wavelength λ1 could be used on input ports 1 and 10 of the cyclic AWG. Configuration module 210 will ensure that only one instance of the same wavelength is used in WDM-PON 10 by using the information held in Table 2. Other OLTs can also access Table 2 to ensure that only one instance of the same wavelength is used by any of the OLTs 41, 42, 43 in WDM-PON 10.

FIG. 3 shows an optical access network comprising a single WDM-PON and connections to multiple operator networks 51, 52, 53. The splitter 21 can comprise a single, or multiple, links 27 between splitter ports 25 and a particular one of the cyclic AWGs 31, 32, 33. Multiple links are shown between ports 25 and each of OLT 41 and OLT 42. FIG. 3 typically represents an early stage of access network deployment. Additional WDM-PONs can be added to arrive at the arrangement shown in FIG. 1.

FIG. 4 shows another embodiment of an optical access network comprising multiple WDM-PONs and connections to multiple operator networks. The number of operator networks is less than the number of WDM-PONs. Again, the splitter 21 can comprise a single, or multiple, links 27 between splitter ports 25 and a particular one of the cyclic AWGs 31, 32, 33. The number of splitter ports 25 should be large enough to enable one OLT to serve users belonging to different WDM-PONs. The limit case is when one operator serves N users, one user per WDM-PON, by means of the same OLT.

Figure 5:
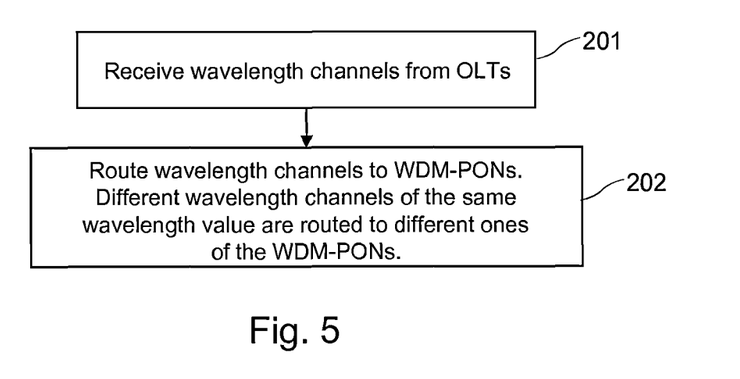
FIGS. 5 to 9 show methods of operating the optical access networks of FIGS. 1 to 4.

FIG. 5 shows a general method of operating the apparatus of the access network. At step 201 wavelength channels are received from OLTs. There can be one OLT or several OLTs. At step 202 wavelength channels are routed to WDM-PONs using the wavelength routing apparatus 110. Different wavelength channels of the same wavelength value are routed to different ones of the WDM-PONs.

Apparatus installed at the Central Office 100 can be modified as additional WDM-PONs are added to the access network. Apparatus installed at the Central Office 100 can be modified as additional operator networks are added. An advantage of this arrangement is that the addition of a new WDM-PON or operator network does not require a significant change to the apparatus which has already been installed. Various scenarios for modifying the access network 5 will now be considered with reference to FIGS. 6 to 9.

Adding a New Subscriber

Figure 6:
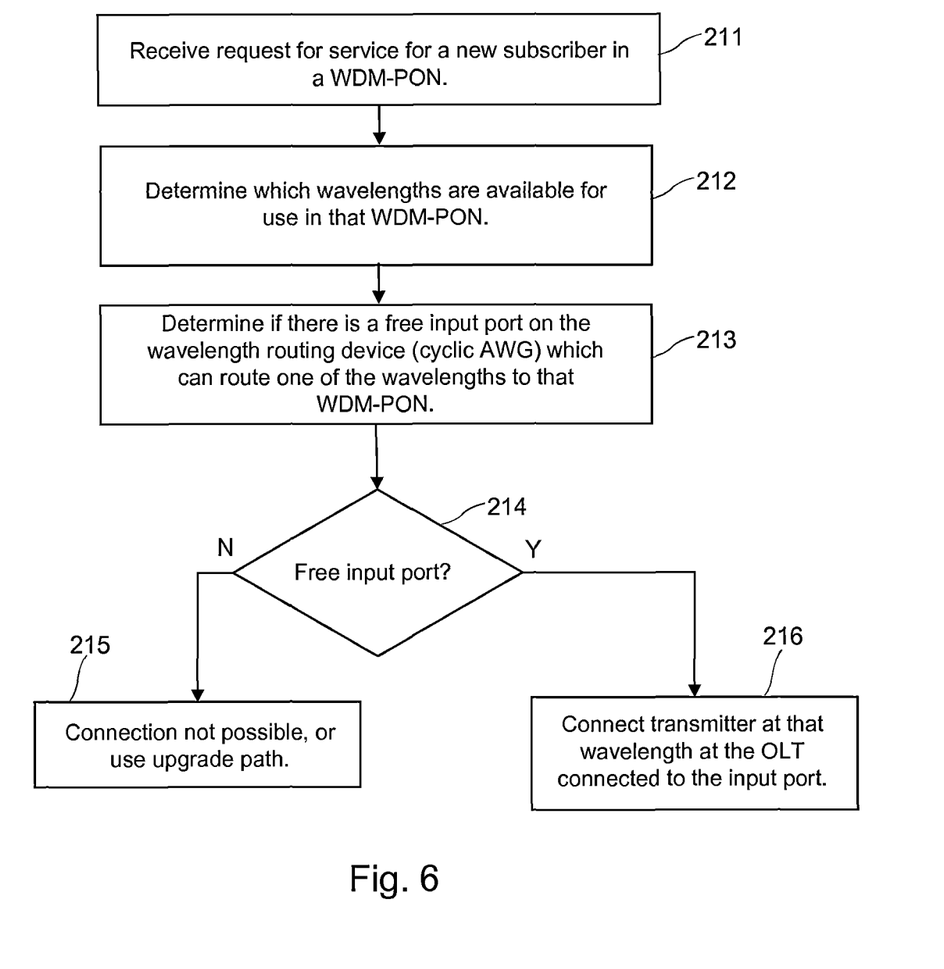

Consider that a new subscriber wishes to obtain service in the access network from a particular operator network (e.g. network 51). The subscriber will be served by one of the existing WDM-PONs 10, 11, 12. Assume the new subscriber can be served by WDM-PON 10. Depending on the type of access network, a new ONT 13 is installed at the subscriber premises (FTTH), or cabling is installed between an existing ONT 13 in the WDM-PON and a new terminal in the subscriber premises (FTTC). No additional apparatus is required in the CO. FIG. 6 describes the method. At step 211 a request for service is received for a subscriber in one of the WDM-PONs. At steps 212, 213 the configuration process described above is performed to find an available wavelength between the OLT 41 of operator network 51 and the new subscriber in WDM-PON 10. When an available wavelength and input (CO side) port of the AWG 31 is found, a transceiver in OLT 41 is connected to the input (CO side) port 35. Step 214 checks if there is a free input port. If a free input port is found at step 214, the method proceeds to step 216 and a transmitter operating at the available wavelength is connected to the input port. As described above, this can comprise manually, or automatically, forming a connection between a source operating at the required wavelength and the required input port 35 of the AWG, or by controlling a tunable source connected to the input port to operate at the required wavelength. If a free input port is not found at step 214, the method proceeds to step 215. A connection is not possible using the existing apparatus. An upgrade path may be used to provide service, as described later. The upstream path is configured at the same time. Typically, the upstream wavelength will be a fixed offset from the downstream wavelength. A receiver is connected to the AWG port.

Adding a Connection to a New Operator Network

Figure 7:
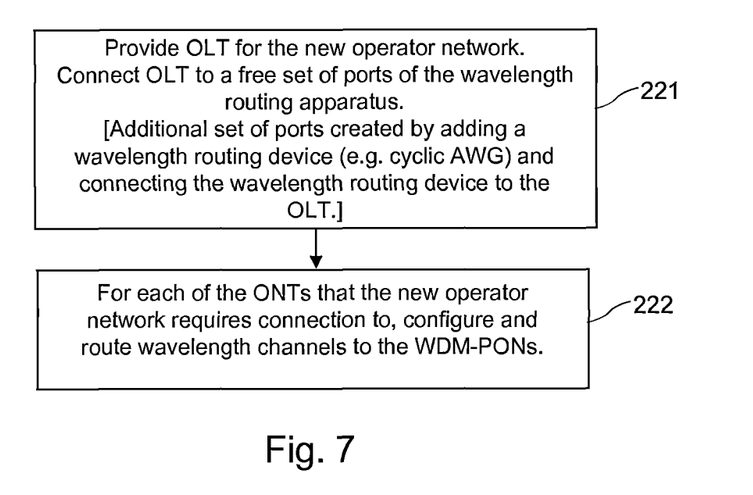

Referring to FIG. 1, consider that the CO already connects to operator networks 51, 52. A new operator network 53 wishes to connect to the access network 5. FIG. 7 describes the method. At step 221 an OLT 43 is provided for the new operator. The OLT is connected to a free set of ports of the wavelength routing apparatus. Advantageously, the set of ports is created by installing an additional AWG 33 at the CO 100. At step 222, for each of the ONTs that the new operator network requires connection to, wavelength channels are routed to the WDM-PONs. Advantageously, one or more links 27 are added between splitters 21, 22, 23 of the WDM-PONs 10, 11, 12 and the new AWG 33. The configuration process described above is performed to find available wavelengths to serve each of the ONTs in the WDM-PONs 10, 11, 12 which require service from the new operator network 53. When an available wavelength and input (CO side) port of the AWG 33 is found, a transceiver in OLT 43 is connected to the input (CO side) port 35. As described above, this can comprise a manual or automatic switch between a source operating at that wavelength and the required input port 35 of the AWG, or by controlling a tunable source connected to the input port to operate at the required wavelength. The upstream path is configured at the same time. Typically, the upstream wavelength will be a fixed offset from the downstream wavelength. A receiver is connected to the AWG port. Step 222 is repeated for each ONT requiring service by the new operator network.

Adding a New WDM-PON

Figure 8:
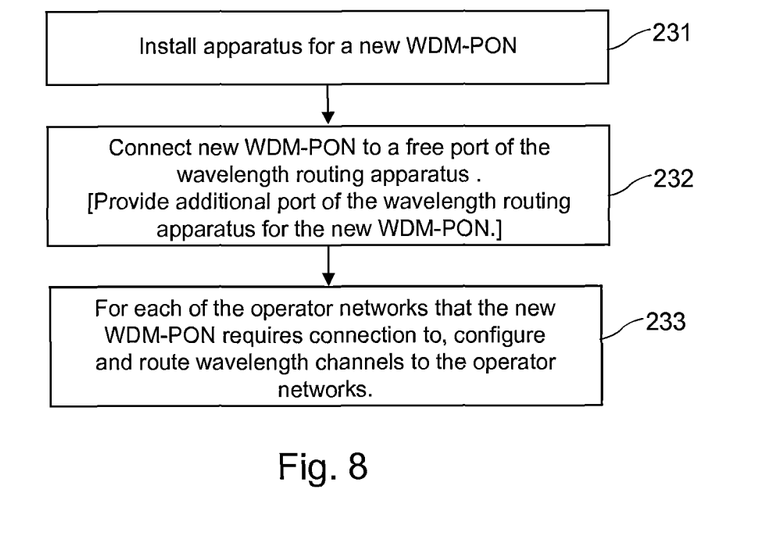

A new WDM-PON can be added to the access network. Referring to FIG. 1, consider that WDM-PONs 10 and 11 already exist. FIG. 8 describes the method for adding a new WDM-PON 12 to the access network. Apparatus for the new WDM-PON 12 is deployed at step 231. This comprises ONTs 13, fibres 14, a remote node 15 and trunk fibre 16 for the new WDM-PON. At step 232 the trunk fibre is connected to a free port 24 on the wavelength routing apparatus 110. Advantageously, the port 24 is provided by adding a splitter 23 to the wavelength routing apparatus 110. Links 27 are added between splitter 23 and each of the AWGs 31, 32, 33. For each of the operator networks that the new WDM-PON requires connection to, wavelength channels are configured and routed to the operator networks at step 233. The configuration process described above is performed to find available wavelengths to serve ONTs in the new WDM-PON 13. ONTs in the new WDM-PON 12 can be served by any of the operator networks 51, 52, 53. When an available wavelength and input (CO side) port of the respective AWG 31, 32, 33 is found, a transceiver in respective OLT 41, 42, 43 is connected to the input (CO side) port 35 of the AWG. The upstream path is configured at the same time. Typically, the upstream wavelength will be a fixed offset from the downstream wavelength. A receiver is connected to the AWG port. This is repeated for each ONT requiring service in the new WDM-PON.

Transferring an Existing Subscriber to a New Operator

Figure 9:
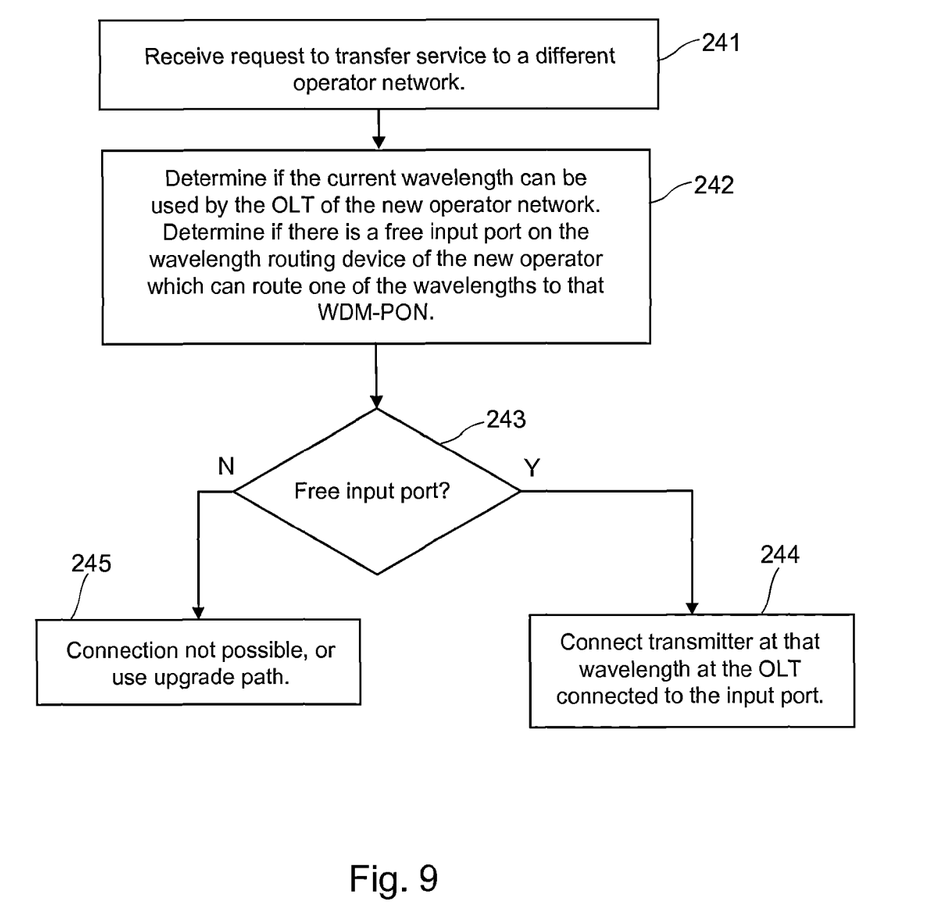

Consider that an existing subscriber wishes to obtain service in the access network from a different operator network. Consider a subscriber in WDM-PON 10 wishes to transfer from operator network 51 to operator network 52. No additional apparatus is required in the CO. FIG. 9 describes the method. At step 241a request to transfer service is received. The configuration process described above is performed to determine if the current wavelength (e.g. $\lambda 1$) that is used between the ONT 13 and OLT 41 can be used between the OLT 42 of the new operator network 52 and the subscriber in WDM-PON 10. This is because the operating wavelength of the ONT 13 is fixed at the deployment, when the ONT 13 is connected to a particular one of the ports 14 of the remote node 15. A change of the operating wavelength of the ONT would require a change at the remote node 15. Step 243 checks if there is a free input port. If a free input port is found at step 243, the method proceeds to step 244 and a transmitter in OLT 42, operating at the wavelength, is connected to the input port of AWG 32. The transceiver in OLT 41 is disconnected from the input (CO side) port 35 of AWG 31 and the tables held in store 220 are updated to reflect the new configuration. If a free input port is not found at step 243, the method proceeds to step 245. A connection is not possible using the existing apparatus. An upgrade path may be used to provide service, as described later. Typically, the upstream wavelength will be a fixed offset from the downstream wavelength. A receiver is connected to the same port of AWG 32.

Channel Upgrade Method

In the method described above, the configuration unit 210 determines which wavelengths are not already used on the WDM-PON and determines if, for at least one of these wavelengths, there is a free input (CO side) port of the AWG from where it is possible to send the wavelength to the corresponding output (user side) port. If the check is positive, the operator plugs an optical transceiver (e.g. a SFP) emitting at that wavelength on the AWG input (CO side) port. If the check is negative, the configuration module repeats until a free port is found on other OLTs owned by the operator. If no free port is found on any OLT of the operator, the apparatus of FIG. 1 does not permit a connection.

Figure 10:
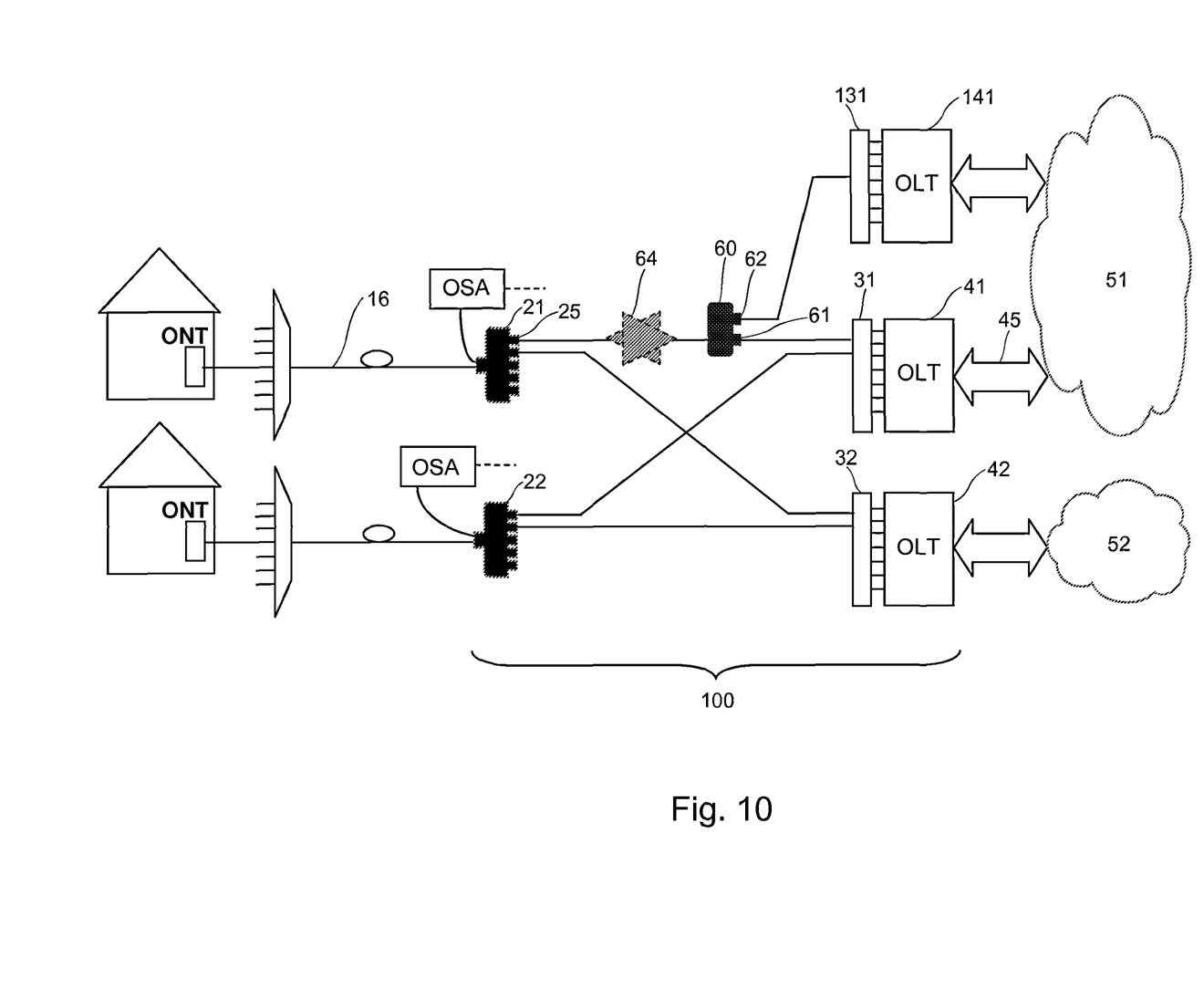
FIG. 10 shows an embodiment of an optical access network with additional connections between WDM-PONs and operator networks.

FIG. 10 shows an alternative apparatus which allows additional connections. An additional splitter 60 is added upstream of the 1:N splitter 21. In FIG. 4 this additional splitter 60 is a 1:2 splitter to minimise losses, although the splitter can split a signal a larger number of ways. One port 61 of the new splitter 60 is connected to the N×N AWG 31, as in the apparatus of FIGS. 1 to 3. The other port 62 of splitter 60 is used for expansion. For example, it can be connected to an additional N×N cyclic AWG 131, with an associated OLT 141. It may be necessary to compensate for the additional insertion loss introduced by the splitter 60 by means of optical amplifiers 64.

In FIGS. 1, 3 and 4, the wavelength routing apparatus 110 which routes wavelengths between WDM-PONs 10, 11, 12 and OLTs 41, 42, 43 of different operator networks can be co-located at a central office CO 100. However, the AWG of one operator network can be located at a different physical location from the AWG of another operator. This allows further flexibility. Advantageously, the OLTs 41, 42, 43 of different operators share configuration data 210, thereby still allowing the OLTs 41, 42, 43 of different operator networks to co-ordinate their use of wavelength channels.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A system for use in an optical access network, the access network comprising L wavelength division multiplexed access sub-networks, where L≥2, each of the wavelength division multiplexed access sub-networks arranged to use a set of wavelength channels and having an optical link for carrying a signal comprising a multiplexed set of the wavelength channels, the system comprising:
M optical line termination apparatus, where M≥1, each for receiving traffic from a respective operator network and for outputting traffic on the wavelength channels;
a wavelength routing apparatus comprising M sets of first ports and L second ports, each set of first ports for connecting to a respective one of the optical line termination apparatus and each second port for connecting to an optical link of a respective one of the wavelength division multiplexed access sub-networks, the wavelength routing apparatus being arranged to route the wavelength channels between the sets of first ports and the second ports and to route different wavelength channels of the same wavelength to different ones of the second ports.

2. The system according to claim 1 wherein the wavelength routing apparatus is arranged to route different wavelength channels of the same wavelength received from one of the optical line termination apparatus to different ones of the second ports.

3. The system according to claim 1 wherein the wavelength routing apparatus is also arranged to route wavelength channels received on the second ports to the sets of first ports.

4. The system according to claim 1 wherein the wavelength routing apparatus comprises:
L splitter/combiner each connected to a respective one of the second ports, each splitter/combiner having a plurality of third ports and arranged to combine and output on the second port signals received on the plurality of third ports;
M wavelength routing devices each connected to a respective one of the sets of first ports and also having fourth ports and arranged to route wavelength channels between the sets of first ports and the fourth ports in dependence upon a wavelength of the wavelength channel and on which port of the set of first ports the wavelength channel is received; and,
links arranged to connect the fourth ports of the wavelength routing devices to the third ports of the L splitter/combiners.

5. The system according to claim 4 wherein the wavelength routing devices are cyclic arrayed waveguide gratings.

6. The system according to claim 4 further comprising a further splitter/combiner connected in a path between one of the third ports of one of the L splitter/combiners and a fourth port of one of the wavelength routing devices, the further splitter/combiner providing a port for connecting to a further wavelength routing device.

7. The system according to claim 1 further comprising a controller and a memory for storing information about which wavelengths are in use for the wavelength channels in each of the wavelength division multiplexed access sub-networks.

8. The system according to claim 7 wherein the controller is arranged to configure an optical line termination apparatus to operate at a wavelength based on the stored information.

9. The system according to claim 7 further comprising a monitoring unit for monitoring which wavelengths are in use for the wavelength channels in each of the wavelength division multiplexed access sub-networks.

10. The system according to claim 1 wherein M≥2.

11. A method of operating a system in an optical access network, the system including L wavelength division multiplexed access sub-networks, where L≥2, each of the wavelength division multiplexed access sub-networks arranged to use a set of wavelength channels, each wavelength division multiplexed access sub-network having an optical link for carrying a signal comprising a multiplexed set of the channels, the system further including M optical line termination apparatus, where M≥1, each being connected to a respective operator network, the method comprising:
receiving traffic on wavelength channels from one of the optical line termination apparatus;
routing the wavelength channels to the wavelength division multiplexed access sub-networks such that different wavelength channels of the same wavelength are routed to different wavelength division multiplexed access sub-networks.

12. The method according to claim 11 wherein the step of routing the wavelength channels comprises:
routing different wavelength channels of the same wavelength received from one of the optical line termination apparatus to different ones of the wavelength division multiplexed access sub-networks.

13. The method according to claim 11 further comprising:
receiving wavelength channels from the wavelength division multiplexed access sub-networks; and
routing the received wavelength channels to the optical line termination apparatus.

14. The method according to claim 11 wherein the step of routing the wavelength channels comprises:
applying the wavelength channels to a wavelength routing device which routes wavelength channels between ports of the device in dependence upon a wavelength of the wavelength channel and which port of the device the wavelength channel is received;

forwarding outputs of the wavelength routing device to L splitter/combiners, there being a splitter/combiner associated with each of the L wavelength division multiplexed access sub-networks; and combining signals received at each splitter/combiner and forwarding the combined signal to the respective wavelength division multiplexed access sub-network.

15. The method according to claim 11 further comprising:
connecting a first of a set of operator networks to a new subscriber in a first of the L wavelength division multiplexed access sub-networks;

selecting a wavelength channel for the new subscriber; and causing a transmitter in the optical line termination apparatus of the first operator network to transmit on the wavelength channel.

16. The method according to claim 15 wherein the system comprises a wavelength routing apparatus comprising L splitter/combiners each connected to one of the wavelength division multiplexed access sub-networks and M wavelength routing devices each connected to a respective one of the optical line termination apparatus, each wavelength routing device arranged to route wavelength channels between ports of the device in dependence upon a wavelength of the wavelength channel and which port of the device the wavelength channel is received, and the step of selecting a wavelength channel for the new subscriber comprises:

determining which wavelengths are available for use in the first wavelength division multiplexed access sub-network; and determining if there is an available port in the wavelength routing device which can connect one of the available wavelength channels to the first wavelength division multiplexed access sub-network and, if so, causing a transmitter in the optical line termination apparatus to transmit on the wavelength channel.

17. The method according to claim 11 further comprising connecting to a new operator network by:

providing an additional optical line termination apparatus;

connecting the additional optical line termination apparatus to the new operator network; and for each of the L wavelength division multiplexed access sub-networks that the new operator network requires connection to, routing the wavelength channels to the wavelength division multiplexed access sub-network.

18. The method according to claim 17 wherein the system comprises a wavelength routing apparatus comprising L splitter/combiners each connected to one of the L wavelength division multiplexed access sub-networks and M wavelength routing devices each connected to a respective one of the optical line termination apparatus, the method comprising:

providing an additional wavelength routing device for the new operator network;

connecting the additional wavelength routing device to the additional optical line termination apparatus; and for each of the L wavelength division multiplexed access sub-networks that the new operator network requires connection to, connecting the additional wavelength routing device to a splitter/combiner serving the wavelength division multiplexed access sub-network.

19. The method according to claim 11 further comprising:
connecting to a new wavelength division multiplexed access sub-network; and for each of a set of operator networks that the new wavelength division multiplexed access sub-network requires connection to, routing the wavelength channels between the new wavelength division multiplexed access sub-network and the operator networks.

20. The method according to claim 19 wherein the system comprises a wavelength routing apparatus comprising L splitter/combiners each connected to one of the L wavelength division multiplexed access sub-networks and M wavelength routing devices each connected to a respective one of the optical line termination apparatus, and wherein the step of connecting to the new wavelength division multiplexed access sub-network comprises:

providing an additional splitter/combiner for connecting to the new wavelength division multiplexed access sub-network; and for each of the operator networks that the new wavelength division multiplexed access sub-network requires connection to, connecting the additional splitter/combiner to the wavelength routing device of each of the operator networks.

21. The method according to claim 11 further comprising:
transferring a subscriber, using a first wavelength channel in a first of the wavelength division multiplexed access sub-networks from a first of the operator networks to a second of the operator networks by:

determining if the first wavelength channel can be used by an optical line termination apparatus of the second operator network; and if the first wavelength channel can be used by an optical line termination apparatus of the second operator network, causing a transmitter in the optical line termination apparatus of the second operator network to transmit on the wavelength channel.

22. The method according to claim 21 wherein the system comprises a wavelength routing apparatus comprising L splitter/combiners each connected to one of the wavelength division multiplexed access sub-networks and M wavelength routing devices each connected to a respective optical line termination apparatus, each wavelength routing device having the respective set of first ports and fourth ports and arranged to route wavelength channels between ports in dependence upon a wavelength of the wavelength channel and which port the wavelength channel is received, and the step of determining if the first wavelength channel can be used by an optical line termination apparatus of the second operator network comprises determining if there is an available port in the wavelength routing device connected to the second operator network which can connect the first wavelength channel to the first wavelength division multiplexed access sub-network.

* * * * *